United States Patent [19]
Edick et al.

[11] 4,331,895
[45] May 25, 1982

[54] DUCTED ROTOR AND LAMINATION WITH DEEP RADIAL PASSAGEWAY

[75] Inventors: John D. Edick, Wickliffe; Paul K. Doering, Massillon, both of Ohio

[73] Assignee: Reliance Electric Company, Cleveland, Ohio

[21] Appl. No.: 40,134

[22] Filed: May 18, 1979

[51] Int. Cl.³ .............................................. H02K 1/32
[52] U.S. Cl. ................................. 310/61; 310/60 A; 310/211; 310/216
[58] Field of Search ...................... 310/61, 64, 42, 65, 310/60 R, 60 A, 53, 57, 58, 59, 211, 212, 197, 182, 183, 216, 217, 261, 263, 264, 265

[56] References Cited

U.S. PATENT DOCUMENTS

| | | | |
|---|---|---|---|
| 890,577 | 6/1908 | Richards | 310/61 |
| 2,381,297 | 8/1945 | Lynn | 310/61 |
| 2,486,798 | 11/1949 | Mollenhauer | 310/211 |
| 2,944,171 | 7/1960 | Alger | 310/211 |
| 2,956,186 | 10/1960 | Wall | 310/211 |
| 3,166,804 | 1/1965 | Satola | 310/211 |
| 3,182,949 | 5/1965 | Schacht | 310/64 |
| 3,684,906 | 8/1972 | Lenz | 310/64 |

FOREIGN PATENT DOCUMENTS 2834988 3/1979 Fed. Rep. of Germany ........ 310/61

*Primary Examiner*—R. Skudy
*Attorney, Agent, or Firm*—Pearne, Gordon, Sessions, McCoy & Granger

[57] ABSTRACT

A squirrel cage rotor, and a lamination is disclosed, wherein cooling ducts and passages are provided in the rotor. A first rotor section may be of standard laminations and only one type of duct section has radially extending passageways between fingers. The entire duct section is made from a plurality of laminations having such fingers radially extending from the central core portion of the individual laminations so that the radial passageways extend to the inner wall of longitudinal ventilating ducts. In the outer ends of each finger a rotor bar aperture is formed so that the finger is a casing for such rotor bar. Initially, each duct lamination has a unitary bridge at the outer periphery joining adjacent fingers to add rigidity to the fingers. The assembled stacks of laminations making the two rotor sections are then cast with molten metal, e.g., aluminum, under low pressure to form a squirrel cage. Afterward, the rotor periphery is machined to remove the unitary bridges and to open the spaces between the fingers to act as radial vent passageways. These passageways communicate with longitudinally extending vent ducts within the rotor.

25 Claims, 4 Drawing Figures

DUCTED ROTOR AND LAMINATION WITH DEEP RADIAL PASSAGEWAY

BACKGROUND OF THE INVENTION

Most industrial Ac motors in the 500 horsepower to 10,000 horsepower range utilize ducted rotors and stators. Such ducted rotors are ones which have longitudinally extending vent ducts inside the rotor and also one or more duct sections wherein air passageways extend radially outwardly between the squirrel cage rotor bars to the periphery of the rotor. Usually, the stator has aligned, radially directed ducts to accept such air flow. The air flow is created by the inherent pumping action of the radial passageways at the rotor periphery, being of a larger radius than the inlets to the longitudinal vent ducts. Additionally, one or more fans may be provided on the rotor to enhance the air flow for cooling.

The prior art ducted rotors using a cast squirrel cage, e.g., of aluminum, were generally cast under high pressure in order to attempt to fill the mold cavity with aluminum as rapidly as possible for high production rate and to avoid excessive heating of the dies. Such high pressure casting utilized pressures in the order of 500 to 2000 psi for injection and then about 1000 psi during the consolidation phase, namely, the pressure on the molten aluminum during cooling, until it solidified sufficiently to permit removal from the casting press. To make a ducted rotor under this system, it was usual, as shown in U.S. Pat. Nos. 3,182,949 or 3,166,804, to utilize hardened steel finger inserts and split clamping rings. These finger inserts had to be inserted by hand during the lamination stack assembly prior to squirrel cage casting. Also, such finger inserts had to be removed by hand after casting. The tooling costs for each different rotor diameter and for each different type of conductor bar slot were quite expensive. Additionally, six to eight hours of labor were required to insert and remove such finger insert tooling. Furthermore, the chance of improper duct tooling placement in a rotor with 200 to 1000 separate finger insert tools was great, and if there was such improper placement, then this could result in molten aluminum leaks, which could cause an incomplete cavity fill, open conductor bars, and unusable rotors. High pressure cast ducted rotors experienced a 5%–10% scrap rate.

A second ducted rotor method of the prior art was the use of a flat metal stock which was formed into an elongated loop as a conductor bar spacer and then spot-welded to a rotor lamination. These conductor bar spacers formed part of the mold cavity in the duct section of the rotor. Such bar spacers were more susceptible to aluminum leaks during casting, due to distortions introduced by the spot welding and by the high clamping forces inherent in the high pressure process.

Still another method of making ducted rotors was to fabricate the squirrel cage. Metal bars, for example of copper, were inserted through the conductor bar apertures in a stack of laminations, and then the ends of the copper bars were brazed to a circular end ring at each end of the stack of laminations. Such fabricated squirrel cage could be used with ducted rotors wherein duct spacer sections were used along the length of the rotor.

A primary difficulty with the high pressure cast aluminum or aluminum alloy squirrel cage rotors was the high scrap rate of 5%–10%, plus considerable voids in the cast metal, especially in the upper end ring and unitary fan blades. Such voids were caused by the turbulence in the flowing metal under high pressure. Also, air trapped within the mold caused such voids in the sprues and end rings. Another problem with the high pressure cast rotors was that the rotor often was not straight, even though the laminations were machined after the rotor was cast. This lack of straightness was due to the fact that the porosity in one group of conductor bars on one side of the rotor might be different from the degree of porosity on the other side of the rotor, and when the rotor heated up during operation distortion resulted. This caused unbalance and vibration.

The fabricated squirrel cages utilizing preformed conductor bars were usually considerably more costly in labor and materials, so were rarely used.

The problem to be solved, therefore, is how to construct a ducted rotor at less cost, using less time and tooling, and with a lower scrap rate of completed rotors.

SUMMARY OF THE INVENTION

This problem is solved by a lamination for use in a dynamoelectric machine squirrel cage rotor, comprising in combination, a core portion having a central shaft aperture therein, a plurality of fingers extending generally radially from said core portion and establishing generally radially disposed spaces therebetween, and a rotor bar aperture in the outer end of a majority of said fingers.

The problem is further solved by a ducted squirrel cage rotor comprising, in combination, a central shaft, a first rotor portion and a second rotor portion on said shaft, said first rotor portion having substantially longitudinally extending air duct means, a squirrel cage having rotor bars extending substantially longitudinally through apertures in said first rotor portion and through apertures in said second rotor portion, at least two generally radially extending fingers in said second rotor portion and extending across said air duct means, and at least one generally radial air passageway in said second rotor portion disposed between said two fingers and communicating with said air duct means.

The problem is further solved by a dynamoelectric machine rotor having a first group of laminations with a plurality of squirrel cage conducting bars therein and having a duct section with generally radially disposed passageways between the conductor bars and in fluid communication with longitudinally disposed cooling vent ducts in the first group of laminations, characterized in that said duct section is formed from a plurality of duct laminations.

The problem is further solved by the method of constructing a squirrel cage rotor comprising the steps of assembling a first group of laminations having squirrel cage bar apertures, assembling a second group of laminations having squirrel cage bar apertures in registration with those in said first group, said first group of laminations having longitudinally extending vent duct means, said second group of laminations having generally radially directed fingers which fingers encase said squirrel cage bar apertures, the spaces between said fingers communicating with the vent duct means, introducing molten metal into said squirrel cage bar apertures, and cooling said molten metal to form conductive squirrel cage rotor bars in said bar apertures.

DESCRIPTION OF THE PREFERRED EMBODIMENT

Figure 2:
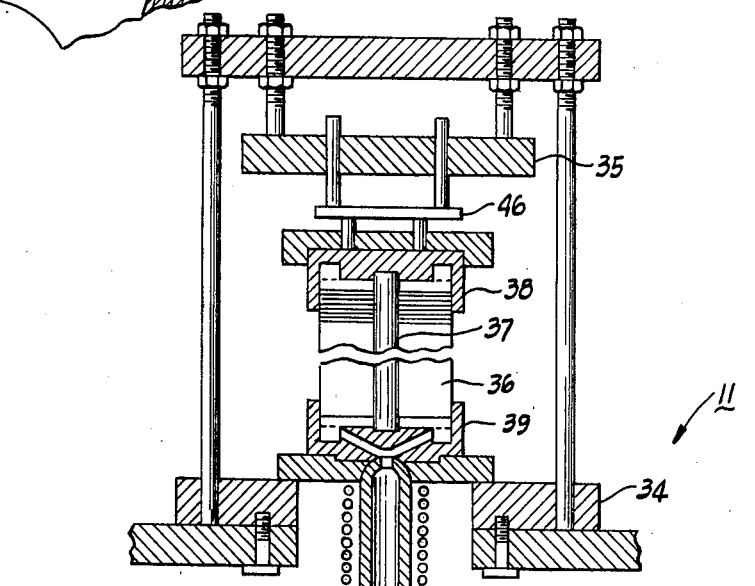
FIG. 2 is a vertical sectional view through a low pressure casting machine.
Figure 2:
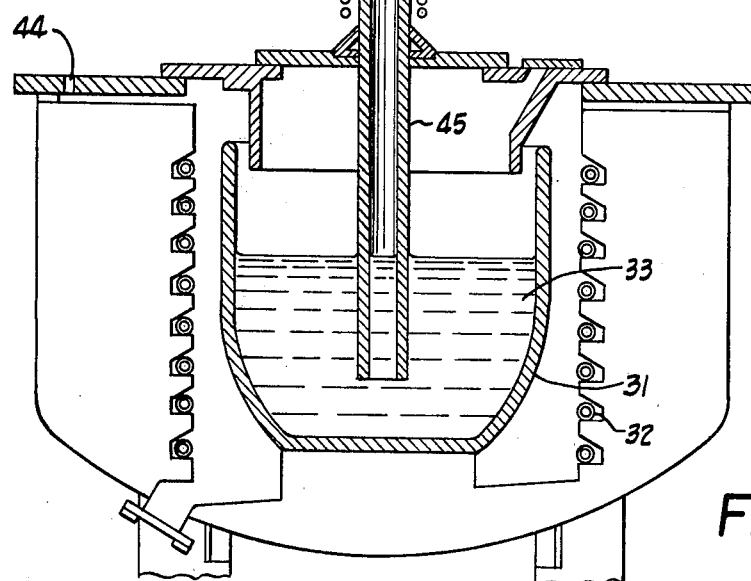

The invention provides a ducted squirrel cage rotor 10 which may be constructed in a low pressure casting machine 11, shown in FIG. 2, and constructed utilizing duct laminations 12. The ducted squirrel cage rotor 10 may be used with dynamoelectric machines, such as induction generators, or more usually with induction motors or at least those which have induction starting characteristics. The rotor 10 may be formed generally from two different rotor sections, a first rotor section 13 and a second rotor section 14. The first rotor section 13 may be formed from magnetically permeable laminations and in its preferred embodiment they are formed from first laminations 15, which have radially extending rotor bar apertures 16 therein and vent duct apertures 17. The second rotor section 14 is formed from a plurality of the duct laminations 12. These duct laminations 12 also have rotor bar apertures 20 which are intended to be aligned with the rotor bar apertures 16 and also have at least two unitary fingers 21 which are unitary with a ringshaped core portion 22 which surrounds the shaft aperture 23. Each finger in this preferred embodiment is spaced from its adjacent finger 21, and preferably there are a large plurality of such fingers in each lamination 12. The fingers in this preferred embodiment are spaced from each other to form radial passageways 24. These fingers are of a length in the order of twice the radial length of the rotor bar apertures 16 and 20 and extend inwardly to the inner edge of the vent duct apertures 17 so that the passageways 24 communicate with the vent duct when a duct lamination 12 is adjacent a first lamination 15.

In the preferred embodiment, bridging means is employed at the outer ends of the fingers 21 initially to help retain such fingers in place. In the preferred embodiment, this bridging means 27 is unitary with the peripheral ends of each of the fingers 21. This is accomplished by stamping the duct laminations 12 and not cutting through the outer periphery of each lamination either for the rotor bar apertures 20 or for the radial passageways 24. These bridges 27 preferably lie slightly radially outwardly from the tip 28 of the rotor bar apertures 20.

Figure 1:
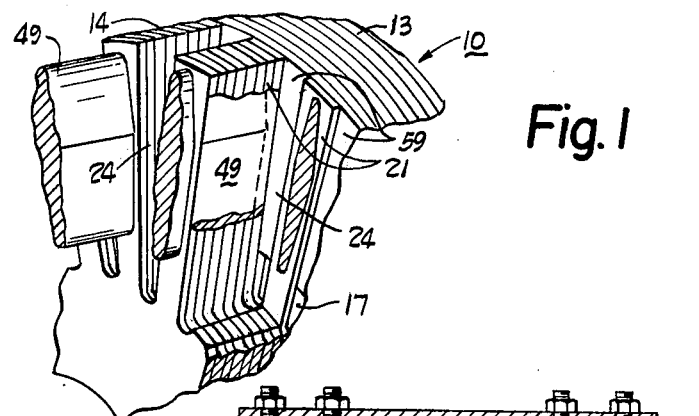
FIG. 1 is a perspective view of a part of a ducted rotor showing the duct section.
Figure 4:
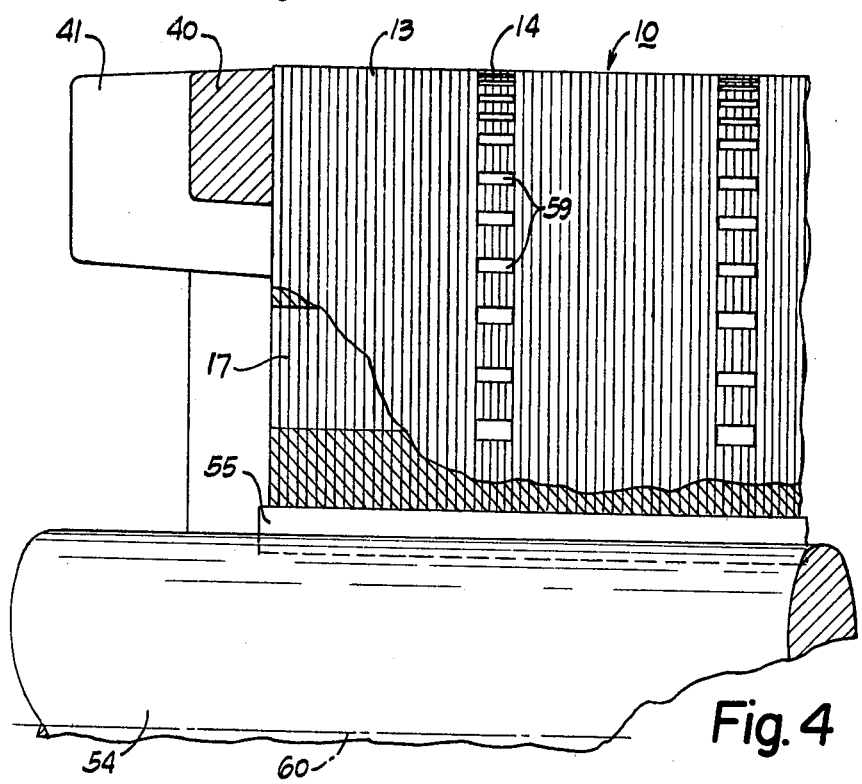
FIG. 4 is a partial elevational and sectional view through a machined, ducted rotor.

The ducted squirrel cage rotor 10 may be constructed by utilizing a first stack of first laminations 15 to form a first rotor section 13, as shown at the twelve o'clock position of FIG. 1. Such laminations 15 are the usual magnetically permeable type and of a suitable thin gauge, for example 24 gauge. These may be stacked to a suitable axial length, for example 2 or 3 inches (5 to 7.5 cm.). Next, the second rotor section 14 is constructed from a stack of duct laminations 12. The duct laminations 12 may also be made from any suitable material, preferably magnetically permeable material, again of 24 gauge as an example. A suitable number of duct laminations are provided in this second stack in order to provide a desired axial length of duct sections, for example ¼ inch or ½ inch (0.62 to 1.25 cm.). Additional first and second rotor sections may be added to provide the desired length of rotor stack 36 generally as shown in FIG. 4. Next, the stacked rotor laminations are placed in a low pressure casting machine 11, as shown in FIG. 2. This casting machine 11 includes a crucible 31 heated by a heater 32 to keep the metal 33 molten. In the upper end of the machine 11, a fixed platen 34 and a movable platen 35 are provided. The stack of rotor laminations 36 is usually stacked on a mandrel 37 and placed between an upper mold 38 and a lower mold 39, which have the proper cavities to form the end rings 40, sprues and fan blades 41. After assembly in the machine 11, gas is supplied at a gas inlet 44 to force the molten metal, e.g., aluminum, up through a feed tube 45 to fill the mold cavity. This might be only 5 to 15 psi pressure for a low pressure fill of the mold cavity to form this squirrel cage. The upper and lower molds 38 and 39 are preferably previously heated to prevent too rapid chilling of the molten metal. After the metal solidifies, then the machine may be opened and an ejection plate 46 used to eject the cast rotor from the machine 11.

Figure 3:
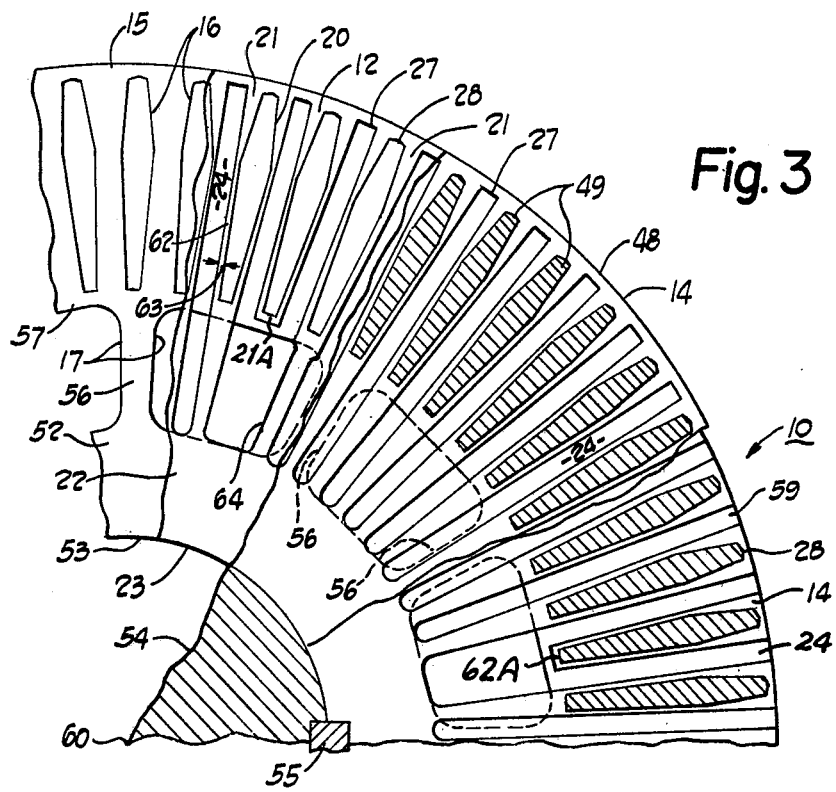
FIG. 3 is a composite sectional view of the lamination, cast rotor, and machined rotor.

FIG. 3, in the sectors at the two o'clock position, shows a cross section through the duct section 48, as cast, with solidified metal forming the conductor bars 49 in the rotor bar apertures 20. This duct section 48 still has the radial passageways 24 which communicate with the vent duct apertures 17 in the first rotor section 13. In this first rotor section 13, it will be noted that there is a core portion 52 similar to core portion 22 in the second or duct rotor section 14. This core portion 52 contains the shaft aperture 53, and in the completed rotor 10, a shaft 54 may be supplied and keyed by a key 55 to the rotor 10. The core portion 52 is joined by magnetically permeable, radial arms 56 to an outer annular ring 57 in which the rotor bar apertures 16 are located. The vent duct apertures 17 thus effectively are disposed between the core portion 52 and the annular ring 57.

In the embodiment shown in FIG. 3, there would be 12 vent apertures 17 in the completed rotor 10 and, of course, 12 radial arms 56. At the two o'clock position, a radial passageway 24 is shown. Depending upon the spacing of the passageways around the periphery, passageway 24 may lie in alignment with a radial arm 56, and hence there can be no communication therebetween. Accordingly, such radial passageway may be eliminated. Where the laminations 12 are made of magnetically permeable material, this increases the available flux carrying capacity of the rotor 10. This makes a wide finger which carries two conductor bars 49 with a magnetic portion therebetween rather than an air space.

FIG. 3 also shows at about the three o'clock position a cross section through the second rotor section 14 after the bridging means 27 has been removed. A convenient way to remove the bridging means is to machine the outer periphery of the rotor. This may be done by a lathe-type tool, grinding, or milling, to form a circular cross section, usually a cylindrical surface, on the completed rotor 10. Removal of the bridging means 27 opens the outer end of the radial passageways 24 so that they may serve as radial air ducts communicating at openings 59 with the outer periphery of the rotor 10 and communicating at the inner end with the vent ducts 17. This completes the air passageways for cooling with the cooling promoted by the fan blades 41 or by the inherent pumping action of the openings 59 being outlets which are at a greater radial distance from the shaft axis 60 than the intake to the vent ducts 17.

It will thus be seen that a method is shown for constructing a ducted squirrel cage rotor 10 which eliminates the high tooling costs per rotor diameter and per slot detail of prior art constructions. Such prior tooling costs might be $10,000 to $15,000. Further, this method eliminates the long time of six to eight hours for hand assembly of such tooling, namely, the finger inserts, their assembly, and removal. Still further, the method uses a low pressure casting machine 11 which avoids the high pressures previously used which caused porosity and voids in the cast metal, which voids and porosity reduced the conductivity of the end rings 40. The present invention thus achieves a lower resistance end ring for greater efficiency of operation of the completed motor or generator with which the rotor 10 is used. Still further, the present invention eliminates much of the porosity formerly encountered by other high pressure casting methods and which porosity in the conductor bars caused slight warpage or off-center conditions during heated operation of the rotor.

Rotors have been constructed according to the present invention with deviation from straightness along the length of the rotor no greater than 0.002 in., whereas it was not uncommon to find 0.010 in. deviation in the prior art constructions. The reason for this increased rotor straightness is attributed in part to a more symmetrical conductor bar stiffness distribution which is a result of the sounder casting with less porosity. The significance of this result is twofold. First, shafts 54 can be inserted into the completed rotor 10 and other rotors without the boring operation of the shaft aperture which is now usually required. Second, the balance and dynamic operation are improved. Vibration is lowered because of reduced bowing of the rotor both at room temperature and during heated operation conditions.

The bridging means 27, which is unitary with the duct laminations 12 as initially fabricated, keeps the magnetic fingers 21 aligned and supported at both ends, because otherwise the lamination would be quite flimsy and difficult to handle and stack.

It will be noted that the fingers 21 in the duct laminations 12 form a casing which is a part of the mold used during casting the molten metal. This casing thus contains the molten metal to form the squirrel cage conductor bars 49. Each casing in each lamination finger is unitarily connected to the core portion 22 by the inner portion of each finger 21. This assures precise alignment of each casing and precise alignment of each radial passageway 24 so that they are in fluid communication with the vent ducts 17. The wall 62 of each casing may, in practical rotors made in accordance with this invention, be only about 0.100 in. in circumferential width, as shown at dimension 63. When a casting machine 11 is used with an 8 psi casting pressure, a 2-inch long conductor bar aperture 16, the lamination wall bending stress is only 3200 psi and the wall deflection is 0.001 in. This is a satisfactorily low bending stress and small deflection so that such casing wall 52 is readily able to withstand the casting pressure and to contain the molten metal. Had the same duct lamination been used in the high pressure casting process, the corresponding stress and deflection would have been a destructive 300,000 psi and 0.10 in., assuming elastic behavior in the steel lamination.

The relatively thin casing wall 62 of each lamination which surrounds each rotor bar may be considered to be a dam which contains the molten metal 33 during casting. This dam or casing seals the squirrel cage cavity against the relatively low casting pressure of five to fifteen psi, but high casting pressures would cause these dams to fail, causing unallowable molten metal leaks.

The conductor bars 49 may be skewed, as is common practice, in order to eliminate cogging of the induction motor during operation. The present invention results in a rotor which is easier to skew than the prior art systems using inserted finger tooling.

The present invention permits the fingers 21 to be slightly narrowed, as shown optionally at the neck 64, and this will promote better air flow, yet the bridging means 27 will still retain the duct laminations 12 in one piece for easy handling and stacking. Also, the present invention permits a modification shown at about the one o'clock position of FIG. 3 where a first group 21A of the fingers, e.g. one of two or two of three, of each duct lamination 12, extend inwardly only from the annular bridging means 27. This removes some of the inner portion of the fingers which would otherwise partially obstruct the vent duct apertures 17 to thus enhance air flow. In the completed rotor 10, shown at the three o'clock position of FIG. 3 with the bridging means 27 removed, this leaves a magnetic casing 62A unattached to other magnetic parts, but supported on the conductor bar 49.

The machining tool achieves the completed ducted squirrel cage rotor 10 and, to provide the openings 59 at the outer ends of the radial passageways 24, may be sufficiently deep to cut into the ends of the conductor bars 49, as at the tip 28 of the rotor bar apertures 20. This would create open slots rather than closed slots in the rotor.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combinmation and arrangement of parts may be resorted to without departing from the spirit and the scope of the invention as hereinafter claimed.

What is claimed is:

1. A lamination for use in a dynamoelectric machine squirrel cage rotor, comprising in combination,
   a core portion having a central shaft aperture therein,
   a plurality of fingers extending generally radially from said core portion and establishing generally radially disposed spaces therebetween,
   a rotor bar aperture in the outer end of a majority of said fingers;
   said fingers having a length sufficient to establish the radially disposed spaces therebetween with an inner radial dimension establishing a part of a substantially longitudinally extending cooling duct; and
   said radially disposed spaces extending to the outer periphery of the rotor lamination.

2. A lamination as set forth in claim 1,
   wherein said lamination is of magnetically permeable material.

3. A lamination as set forth in claim 1,
   wherein said fingers are circumferentially spaced.

4. A lamination as set forth in claim 3,
   including bridging means as the outer periphery of the lamination.

5. A lamination as set forth in claim 4, wherein said bridging means is unitary with adjacent fingers.

6. A lamination as set forth in claim 1, wherein said fingers have a length in the order of twice the radial dimension of said rotor bar aperture.

7. A lamination as set forth in claim 6, wherein said fingers are circumferentially spaced at the inner portions thereof to have the spaces form a part of said substantially longitudinally extending cooling duct.

8. A ducted squirrel cage rotor comprising, in combination,
a central shaft,
a first rotor portion and a second rotor portion on said shaft,
said first rotor portion having substantially longitudinally extending air duct means having a radially inner wall,
a squirrel cage having rotor bars extending substantially longitudinally through apertures in said first rotor portion and through apertures in said second rotor portion,
at least two generally radially extending fingers in said second rotor portion and extending radially outwardly from said air duct means, and
at least one generally radial air passageway in said second rotor portion having a radial depth substantially equal to the radial dimension from said radially inner wall to the outer periphery of said rotor and disposed between said two fingers and communicating with said air duct means.

9. A rotor as set forth in claim 8, wherein said squirrel cage is formed by a metal casting process at a pressure in the order of 5 to 15 psi.

10. A rotor as set forth in claim 8, wherein said second rotor portion is formed from flat, thin laminations.

11. A rotor as set forth in claim 8, wherein said second rotor portion is magnetically permeable.

12. A rotor as set forth in claim 8, wherein said fingers are unitary with a central core part of said second rotor portion.

13. A rotor as set forth in claim 8, including plural ducts in said duct means,
generally radial arms extending between each adjacent pair of ducts in said duct means, and
said fingers including a plurality of generally radially extending spaced fingers with air passageways between adjacent fingers except at those locations radially aligned with said arms.

14. A rotor as set forth in claim 8, including a plurality of fingers in said second rotor portion, and said rotor bar apertures in said second rotor portion lying in said plurality of fingers.

15. A rotor as set forth in claim 14, wherein at least two of said fingers are spaced circumferentially to establish said at least one passageway therebetween.

16. A rotor as set forth in claim 14, wherein said bar apertures in said second portion lie in the outermost part of said fingers.

17. A rotor as set forth in claim 8, wherein said radially extending fingers extend across said air duct means.

18. A rotor as set forth in claim 8, wherein a first group of said radially extending fingers have a radially inner end terminating short of said longitudinal air duct means.

19. A rotor as set forth in claim 18, wherein said second rotor portion is formed from flat, thin laminations, and said first group of said fingers are formed of a casing of flat thin laminations unconnected to the remainder of the laminations in said second rotor portion.

20. A dynamoelectric machine rotor having a first group of laminations with a plurality of squirrel cage conducting bars therein, including a lamination core portion and having a duct section with generally radially disposed passageways between the conductor bars and in fluid communication with longitudinally disposed cooling vent ducts in the first group of laminations, characterized in that said duct section is formed from a plurality of duct laminations,
a plurality of fingers extending generally radially from said core portion in said duct section,
said conducting bars being at least partially in said fingers, and
said fingers and said generally radially disposed passageways therebetween extending across the longitudinally disposed cooling vent ducts.

21. A rotor as set forth in claim 20, wherein said fingers in each duct section lamination have a unitary casing defining conductor bar apertures therein.

22. A rotor as set forth in claim 20, wherein said plurality of fingers are magnetically permeable.

23. A rotor as set forth in claim 20, wherein said fingers are spaced circumferentially, and
the spaces between said fingers forming said generally radial passageways communicating with said vent ducts.

24. A rotor as set forth in claim 23, wherein said squirrel cage conducting bars are formed by a low pressure casting process in the order of 5 to 15 psi.

25. A rotor as set forth in claim 23, wherein a first group of said fingers lie entirely radially outboard of said vent ducts.

* * * * *